Dec. 24, 1957     J. N. AMIGONE     2,817,458
COMBINATION WINE BOTTLE COOLER AND ICE BUCKET
Filed May 6, 1954     2 Sheets-Sheet 1

INVENTOR.
JOSEPH N. AMIGONE
BY
Beau, Brooks, Buckley & Beau,
ATTORNEYS.

Dec. 24, 1957 J. N. AMIGONE 2,817,458
COMBINATION WINE BOTTLE COOLER AND ICE BUCKET
Filed May 6, 1954 2 Sheets-Sheet 2
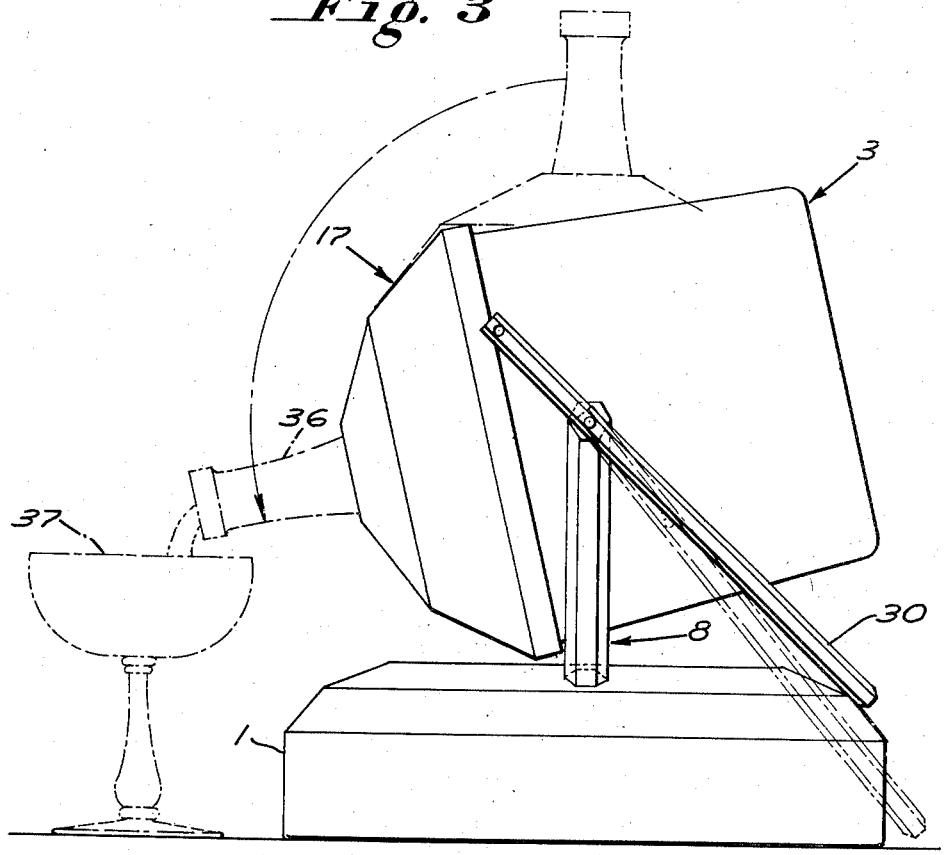
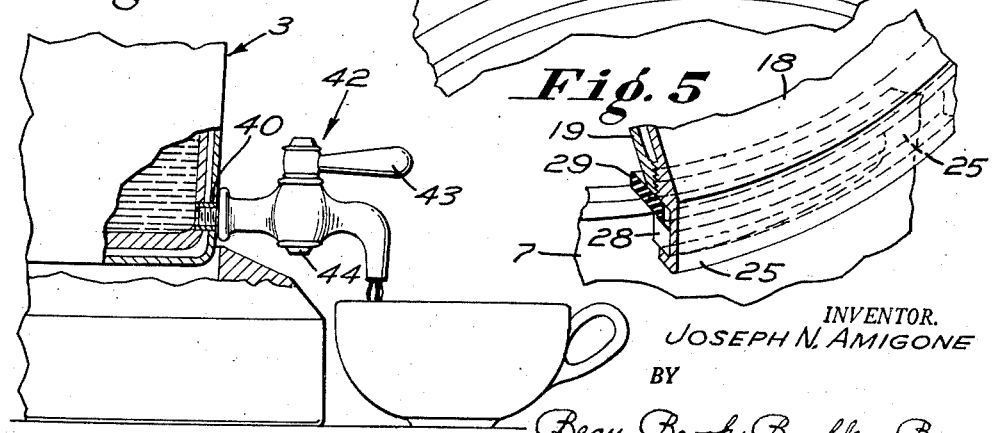
INVENTOR.
JOSEPH N. AMIGONE
BY
Beau, Brooks, Buckley & Beau,
ATTORNEYS.

United States Patent Office 2,817,458
Patented Dec. 24, 1957

2,817,458

COMBINATION WINE BOTTLE COOLER AND ICE BUCKET

Joseph N. Amigone, Buffalo, N. Y.

Application May 6, 1954, Serial No. 428,034

6 Claims. (Cl. 222—131)

This invention relates to a new and useful article of manufacture in the nature of a combination wine bottle cooler and ice bucket.

It has heretofore been the custom to keep champagne and other wine bottles chilled while they are being served by simply resting the same in an open bucket, generally supported on a stand positioned adjacent the table, the bucket being filled with ice. This practice has little to commend itself insofar as appearance is concerned, and it does not keep the contents of the bottle uniformly chilled throughout because the bottle is usually rested on one side whereby it lies at a slant with only its lower side being properly chilled. The bottle must be periodically rotated in the container to keep its entire contents chilled, and even then the chilling is not necessarily uniform throughout.

However, the primary disadvantage of this practice resides in the fact that each time the bottle is lifted from the bucket in order to serve its contents, the ice water drips therefrom and unless the bottle is wiped off each time it is removed from the container, or a cloth is held thereunder, the water dripping therefrom results in an annoying mess. The inconvenience attending this practice is obvious.

Accordingly, it is a primary object of this invention to provide a practical wine bottle cooler which is susceptible of a highly pleasing and decorative appearance and which enables the liquor to be poured therefrom without removing the bottle from the cooler.

A further object of this invention is to provide a wine bottle cooler adapted to hold the bottle in such a manner that its contents are uniformly chilled throughout.

Another object of this invention is to provide a wine bottle cooler arranged so that when it is desired to pour the liquor from the bottle the cooler is merely tipped about a pivot support therefor.

Still another object of this invention is to provide a wine bottle cooler which is adapted for use as an ice bucket.

Still other advantages and objects of the invention will become clearly apparent upon a perusal of the ensuing detailed description, taken together with the accompanying drawing wherein:

Fig. 3 is a view in side elevation showing a combination wine bottle cooler and ice bucket according to my invention in use as a wine bottle cooler;

Fig. 4 is a fragmentary detail view of the locking means on the cover member which is shown inverted;

Fig. 5 is a fragmentary detail view, partly in section, showing the manner of connection between the receptacle main body portion and the cover member therefor; and Fig. 6 is a fragmentary view, partly in section, showing my invention adapted for use as a coffee urn.

Figure 1:
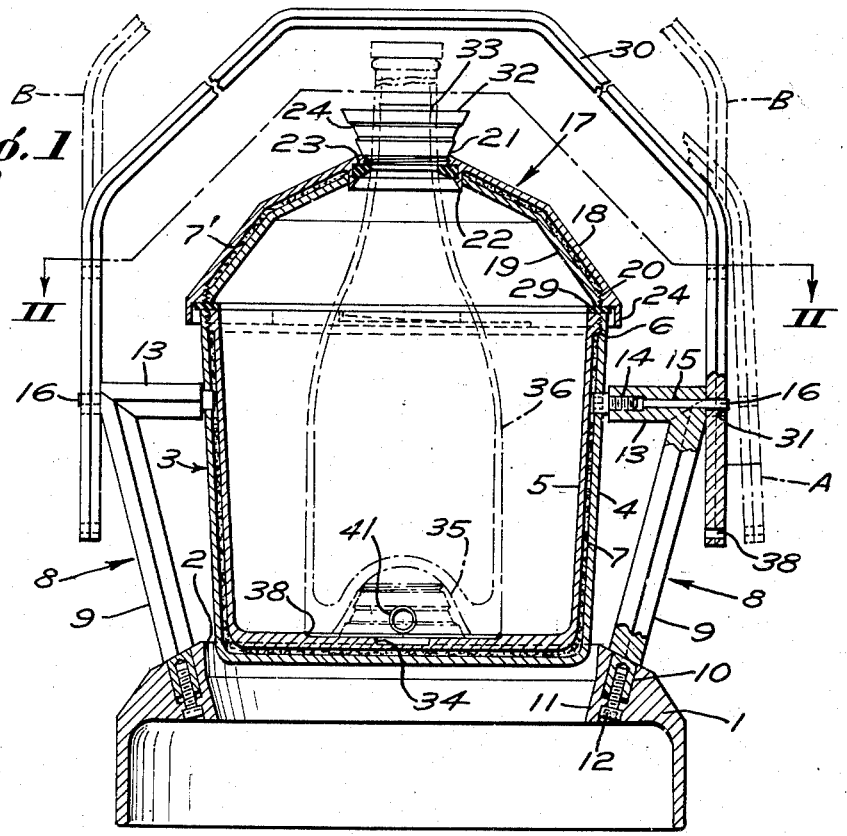
Fig. 1 is a view primarily in vertical section of a combination wine bottle cooler and ice bucket according to my invention.
Figure 2:
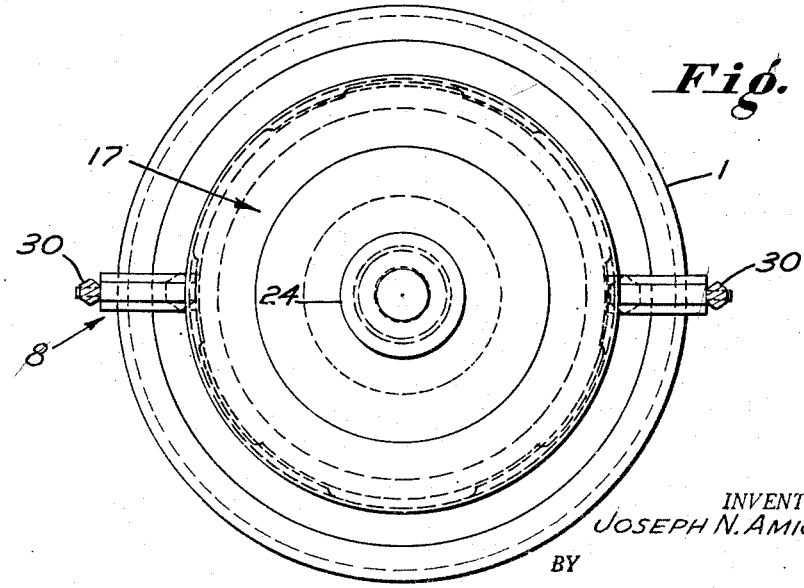
Fig. 2 is a view, partly in section, taken about on line II—II of Fig. 1.

A combination wine bottle cooler and ice bucket according to my invention is characterized in one aspect thereof by the provision of a pivotally supported receptacle or container and a removable cover therefor, both of insulated, double-wall construction, the cover having an opening therethrough surrounded by packing for receiving and bearing against the neck of a bottle, and a cap device adapted to completely close said opening.

In another aspect thereof, a construction according to my invention is characterized by the receptacle supports comprising a pair of open handle members facilitating grasping and moving, and/or by a handle member in the form of an adjustable bail having spaced points of pivotal connection with the receptacle supports.

In another aspect thereof a construction according to my invention is characterized by the receptacle inner bottom wall formed to receive the cap device in interlocking relation therewith for nesting within the recessed bottom wall of a bottle and cooperating with the cover member to prevent the bottle from moving within the container upon tipping thereof.

Referring now to the accompanying drawing showing a preferred form of a combination wine bottle cooler and ice bucket according to my invention, there is provided a base portion 1 preferably provided with a circular recess 2 in the upper wall thereof for accommodating therein the bottom portion of the receptacle main body portion generally designated 3.

The receptacle main body portion 3 is of double wall construction and preferably of generally circular cross section. Body portion 3 comprises an outer wall member 4 formed of brass or other suitable material which can be plated to provide a pleasing appearance, together with an inner wall member 5 preferably of stainless steel in order to keep clean and pure the contents of the receptacle. Wall member 5 is secured in spaced relation with wall member 4, as by a threaded flange 6 engaging the interiorly threaded upper end of wall member 4, whereby the inner surface of wall member 4 can be lined with suitable insulating material 7, such as fiber glass, and the inner wall member 5 then can be inserted into wall member 4 and secured thereto to provide a water-tight and insulated double walled construction.

Obviously, welding or other suitable conventional joining techniques can be used instead of the threaded connection between wall members 4 and 5.

A pair of trunnion support members, generally designated 8, are mounted on base 1 on opposite sides of the receptacle main body portion 3, such mounting being either permanent or detachable as desired. While the primary requisite is to provide a trunnion support for the receptacle main body portion 3, and the supports may comprise a number of different forms, in the preferred embodiment illustrated herein the supports are in the form of open handle devices comprising outwardly and upwardly diverging leg portions 9, detachably secured to base structure 1 as by extensions 10 of reduced diameter fitting into recesses in the relatively thick body part 11 of said base structure and having threaded engagement with suitable fastening devices such as bolts 12 extending upwardly from beneath part 11. The legs 9 terminate at their upper ends in substantially horizontal trunnion portions 13 having trunnion pivot devices 14 having threaded engagement therewith, said pivot devices engaging the outer wall member 4 of the receptacle main body portion to provide a horizontal pivot therefor. The trunnion portions 13 are also bored, as at 15, to receive pins 16 projecting outwardly therefrom for a purpose which will become apparent.

The receptacle main body portion 3 is provided with a removable cover member or lid generally designated 17 and comprising a double wall construction having an outer wall member 18 preferably of the same material as outer wall member 4 and an inner wall member 19 preferably of the same material as inner wall member 5. Wall member 19 is adapted for threaded engagement with wall member 18 at the outer end thereof, as at 20, and wall member 18 is provided centrally thereof with a threaded opening 21 and with a depending annular flange 22 around said opening. Wall member 19 also has a central opening, for receiving said depending annular flange 22 in closely interfitting relation therewith as clearly illustrated in Fig. 1 of the drawing. A suitable seal in the form of a ring type gasket member 23 of resilient material, such as rubber, is carried in a groove around the inner wall surface of flange 22 for bearing against the neck of a bottle, and a closure device in the nature of a cap 24 is adapted for threaded engagement in opening 21, cap 24 being adapted to bear against the gasket 23 to form a water tight seal. Suitable insulating material 7' such as fiber glass, is packed between wall members 18 and 19.

Wall member 18 of lid 17 is provided at its outer end with an annular flange or skirt 24 carrying on its inner surface several cam devices 25 (Fig. 4), such cam devices being for example three in number and comprising a horizontal ledge 26 adjacent a vertical track 27 terminating in an inwardly curving portion 27' (note that lid 17 is inverted in Fig. 4). An equal number of similar cam devices 28 are carried around the upper periphery of wall member 4 of the main body portion 3 (Fig. 5). With this arrangement it is believed clearly apparent that lid 17 is secured to the main body portion 3 by slipping the same thereover with the cam devices 25 being spaced between the cam devices 28, and then rotating lid 17 relative to the main body portion 3 to cause said cam devices 25 and 28 to interfit and thereby lock the lid in place on the main body portion. Lid 17 is removed by rotating it in the opposite direction and lifting it upwardly. A suitable sealing device such as the gasket 29 is interposed between lid 17 and the upper surface of the main body portion 3, whereby to provide a water proof seal therebetween.

It will be noted that supports 8 also function as handle devices on opposite sides of the receptacle whereby to facilitate lifting and moving thereof. I also prefer to provide a supplemental handle in the form of a bail 30 of generally inverted U-shape having openings 31 in its opposite side legs for receiving the pivot pins 16, whereby the bail is pivoted to the supports 8 and can be used for carrying the receptacle while readily pivoting out of the way when the same is in use, as illustrated in Fig. 3.

When used as an ice bucket, the lid 17 is removed from the main body portion 3 in the manner described and the ice is then placed in the main body portion 3, the lid 17 then being replaced thereon. When so used, the cap 24 will be in place to close opening 21 on the lid 17. By virtue of the insulated double wall construction throughout, together with the water proof seal against cap 24 and between the lid and the main body portion, there is provided an ice bucket which will hold a sizable quantity of ice without melting for a substantial period of time and without danger of accidental spilling, in an arrangement wherein the lid is readily removed to permit removal of ice cubes from the container.

When used as a wine bottle cooler, cap 24 is removed to permit the neck of the bottle, shown in broken lines at 36 in Figs. 1 and 3, to be inserted through opening 21 in lid 17 and against the gasket 23, and it is a particular feature of a construction according to my invention that the cap 24 serves as a positioning means for the bottle whereby to enable tipping and other movements of the receptacle. To this end, cap 24 is provided with a flat top surface 32 adapted to fit snugly against the flat inner bottom surface of wall member 5, and is also provided with a raised boss portion 33 which fits snugly within a recess 34 in the said inner bottom surface of wall member 5. In addition, it will be noted that cap 24 is in the general form of a truncated cone, having its side walls of generally circular cross section tapering inwardly from the top surface 32, whereby when my invention is to be used as a wine bottle cooler lid 17 is removed from the main body portion 3, and cap 24 is removed from opening 21, inverted, and fitted to the inner bottom surface of wall member 5 with boss portion 33 being received in recess 34 in the main body portion wall member 5, as shown in broken lines in Fig. 1. The wine bottle is then placed in body portion 3 and over cap 24, with the recess 35 fitting over and receiving the cap 24. With this arrangement, cap 24 with its tapered wall form reaches a considerable distance into the recess 35 in the bottom wall of the wine bottle 36, and when lid 17 is placed back on the container main body portion 3 with the neck of the bottle extending through opening 21, and secured in position thereon, gasket 23 is forced tightly against the neck of the bottle and urges the bottle against the bottom wall of the main body portion 3 in nested relation with the cap 24.

In this way, cap 24 cooperates with gasket 23 on lid 17 to anchor the opposite ends of the bottle whereby the cooler can be tipped about the pivots 14, as illustrated in full lines in Fig. 3, to enable pouring from the bottle 36.

The advantages of a construction according to my invention are obvious. Firstly, the bottle need not be removed from the container or cooler and instead the container is simply tipped when it is desired to pour liquor from the bottle. While it may be carried on a stand placed beside the table, in the form of the invention disclosed herein the container is adapted to be placed directly on the table, with the base 1 and supports 8 being a height such as to enable pouring from the bottle, by tipping the container, directly into the glass generally indicated at 37 in Fig. 3. The seals 29 and 23 maintain a water tight assembly whereby there is no danger of icewater being spilled. Also, cap 24 is operable to maintain the bottle fixedly positioned within the container even when tipped. At the same time, the center of gravity of the container with the bottle therein is below its pivotal mounting whereby the container will return to its upright position wherein the bottle contents are uniformly chilled throughout.

Bail 30 is provided with a second pair of openings 38, positioned closer to the outer ends of the legs thereof and adapted for connection to the pivots 16 when it is desired to provide greater clearance between bail 30 and the lid 17. Thus, when used as an ice bucket a minimum clearance is required and the bail can be pivoted at its openings 31 for compactness. When used as a wine bottle cooler, bail 30 can be pivoted at its openings 38 to provide greater clearance because the bottle neck protrudes further from lid 17 than the cap 24. Opening 2 in base 1 receives the lower end of the main body portion 3 for maximum compactness, and said main body portion is mounted so as to just clear base 1 when tipped on its pivots 14.

It is a particular feature of this invention that cap 24, used to completely close the container when the same is in use as an ice bucket, is not simply placed to one side and possibly lost when the container is used as a wine bottle cooler but is instead fitted to the bottom wall of the container main body portion and assists in securing the wine bottle in position within the container. The strongest support is needed at the bottom of the bottle and is readily provided by the rugged cap 24. If desired an additional recess 38 can be provided in the inner bottom surface of wall member 5 for receiving the lower end of the bottle 36, as illustrated in Fig. 1, but with my aforesaid cap arrangement such additional recess is not necessary.

Also, a construction according to my invention is readily adapted for use as a coffee urn or the like. To this end, there can be provided a tubular conduit 40 (Fig. 6) extending through wall members 4 and 5 adjacent the bottom of the main body portion 3. Conduit 40 is internally threaded and is normally closed by a plug 41 (Fig. 1) which can be removed. A spigot generally indicated at 42 and comprising a conventional construction including a handle 43 for opening and closing a valve 44 can be threaded into the conduit 40. If desired, a force fit or other conventional securing arrangement can be used in place of the threaded connections. Thus, my invention is readily susceptible of such use and by virtue of the stainless steel inner wall members 5 and 19 the contents of the container will be kept clean and pure and will not be contaminated.

Accordingly, it will be seen that my invention has fully accomplished its intended objects, and while but one preferred form thereof has been illustrated and disclosed herein, my invention is susceptible of various modifications and I intend that the same be limited only by the scope of the appended claims.

Having completely disclosed my invention in a preferred form thereof, and described its mode of operation, what I claim as new is:

1. In a combination wine bottle cooler and ice bucket, a base structure, a pair of upright supports carried by said base structure, an open top receptacle pivoted on said supports, a detachable cover member for said receptacle, said cover member having an opening centrally thereof for receiving therethrough the neck of a bottle and gasket means around said opening for bearing against the bottle neck, a bail-type handle having side leg portions and means located at spaced points therealong for connection to said supports, and means detachably pivotally connecting said side leg portions of said handle to said supports at any one of said spaced points along said side leg portions, whereby the clearance between the center portion of said handle and said cover member can be selectively varied.

2. In a wine bottle cooler, a holder including a base portion and a pair of support members extending upwardly therefrom, a bucket type receptacle, means pivotally mounting said receptacle on said support members, a removable cover member for said receptacle, means defining a generally central opening through said cover member for receiving the neck of a wine bottle, sealing gasket means carried by said cover member around said opening for bearing against the bottle neck, a cap device in the form of a plug having a head portion and a tapered shank for fitting in said opening to close the same, and cooperating means on said cap device head portion and on the inner bottom wall of said receptacle for holding said cap device in inverted position on said inner bottom wall against sliding movement thereacross and in substantial alignment with said cover member opening when said cap device is removed therefrom and placed in inverted position with said cap device head portion means in cooperating association with said inner bottom wall means, said cap device when so positioned projecting into the recessed bottom wall of a wine bottle in said receptacle to urge the neck thereof against said gasket means and cooperating with said cover member to hold such bottle against movement relative to said receptacle as the latter is tilted to dispense the contents of the former.

3. In a combination wine bottle cooler and ice bucket a base structure, a pair of supports extending upwardly from said base structure, a container main body portion pivoted on said supports, a removable cover member for said main body portion, said cover member having an opening therethrough for receiving the neck of a bottle and resilient packing around said opening for bearing against the bottle neck, and a removable cap device for completely closing said opening when said container is not in use and when it is in use as an ice bucket, the inner bottom wall surface of said main body portion and said cap device having interlocking parts whereby when said cap device is removed from said opening it can be fitted to said inner bottom wall surface for extending into the recessed bottom wall of a bottle to cooperate with said cover member in maintaining a bottle fixedly positioned within the container when the main body portion thereof is tilted about its pivot.

4. In a combination wine bottle cooler and ice bucket, a supporting base structure, a container adapted for use as a bottle cooler and as an ice bucket and having a main body portion pivoted on said base structure, a removable cover member for said main body portion, said cover member being formed centrally thereof with an opening for receiving the neck of a bottle therethrough, packing means carried by said cover member around said opening for bearing against the bottle neck, and a removable cap device for completely closing said opening, said cap device being of generally circular cross section and having a top wall and a side wall portion with said side wall portion tapering inwardly from said top wall thereof, the inner bottom wall of said main body portion having means centrally thereof for interlocking with said cap device when the same is removed from said opening and inverted on said inner bottom wall means whereby said cap device will extend into the recessed bottom wall of a bottle to cooperate with said cover member in holding the bottle against movement within the container when the latter is tilted about its pivot.

5. The construction set forth in claim 4, wherein said cap device top wall is substantially flat with a raised boss portion thereon, and wherein said main body portion inner bottom wall is substantially flat with a recess therein for receiving said boss portion.

6. The construction set forth in claim 4, wherein said main body portion inner bottom wall is formed with a recess for receiving the bottom portion of a wine bottle to assist said cap device and said cover member in securing a wine bottle against movement within said container.

References Cited in the file of this patent

UNITED STATES PATENTS

| | | |
|---|---|---|
| 81,814 | Nuellens et al. | Sept. 1, 1868 |
| 123,390 | Geenen | Feb. 6, 1872 |
| 592,781 | Hertwig | Nov. 2, 1897 |
| 991,417 | Boggs | May 2, 1911 |
| 1,019,416 | Bonnell | Mar. 5, 1912 |
| 1,048,368 | Steel | Dec. 24, 1912 |
| 1,384,786 | Thompson | July 19, 1921 |
| 1,809,079 | Smith | June 9, 1931 |